(12) United States Patent
Hsu

(10) Patent No.: US 6,209,600 B1
(45) Date of Patent: Apr. 3, 2001

(54) INNER TUBE HAVING MULTIPLE AIR CELLS AND BREAKERS

(76) Inventor: Shut Chen Hsu, No. 7, Alley 1, Lane 163, Sec. 5, Nun-Chuan Rd., I Lan (TW)

(*) Notice: Subject to any disclaimer, the term of this patent is extended or adjusted under 35 U.S.C. 154(b) by 0 days.

(21) Appl. No.: 09/342,208

(22) Filed: Jun. 29, 1999

Related U.S. Application Data (63) Continuation-in-part of application No. 09/165,740, filed on Oct. 5, 1998, now Pat. No. 6,050,312.

(51) Int. Cl.[7] ............................................. B60C 5/08
(52) U.S. Cl. ..................... 152/157; 152/159; 152/195; 152/317; 152/512
(58) Field of Search ........................ 152/512, 157, 152/158, 159, 165, 166, 195, 310–322

(56) References Cited

U.S. PATENT DOCUMENTS

| | | | |
|---|---|---|---|
| 1,061,204 | * 5/1913 | Smith et al. ......................... | 152/157 |
| 1,216,826 | * 2/1917 | McTaggart .......................... | 152/195 |
| 1,444,892 | * 2/1923 | Westgate et al. .................... | 152/316 |
| 1,499,793 | * 7/1924 | Taylor ................................. | 152/321 |
| 1,808,404 | * 6/1931 | Freerksen ........................... | 152/321 |
| 3,256,123 | * 6/1966 | Hart ................................... | 152/317 |
| 5,031,679 | * 7/1991 | Shoner ............................... | 152/157 |

* cited by examiner

Primary Examiner—Geoffrey L. Knable
(74) Attorney, Agent, or Firm—Rosenberg, Klein & Lee (57) ABSTRACT

An inner tube for a vehicle tire, which includes a base having air chambers in two opposite side walls thereof and zigzag insertion slots around the periphery of each of the side walls, a multi-cell rubber tube mounted on the base between its side walls and defining a plurality of zigzag insertion slots arranged one over another around a center opening thereof and an annular insertion slot surrounding the zigzag insertion slots for mounting patching glue, and a plurality of breaker assembles respectively mounted in the zigzag insertion slots in the base and the multi-cell rubber tube.

1 Claim, 9 Drawing Sheets

INNER TUBE HAVING MULTIPLE AIR CELLS AND BREAKERS

CROSS REFERENCE OF RELATED APPLICATION

The present invention is a continuation-in-part of U.S. patent application Ser. No. 09/165,740, now U.S. Pat. No. 6,050,312, filed on Oct. 5, 1998 entitled "Inner tube with multiple air cells and breakers for protection against piercing of an external pointed object".

BACKGROUND OF THE INVENTION

The present invention relates to vehicle tires, and more particularly to an inner tube for a vehicle tire which improves the drawbacks of U.S. patent application Ser. No. 09/165,740, entitled "Inner tube with multiple air cells and breakers for protection against piercing of an external pointed object".

The inner tube according to U.S. patent application Ser. No. 09/165,740, has multiple air cells and breakers for protection against piercing of an external pointed object. This structure of inner tube is functional, however it still has drawbacks as outlined hereinafter.

1. The multi-cell rubber tube comprises a plurality of big arched cells and a plurality of small arched cells alternatively arranged around the center through hole thereof, a plurality of rubber blocks respectively plugged into the big arched cells, a plurality of glued breakers respectively plugged into the small arched cells, and a layer of patching agent covered over the arched cells to seal the rubber blocks and the glued breakers inside the cells. This complicated structure consumes much manpower and time during its assembly process.

2. The breakers are made of resilient metal or like material, and fastened to the small arched cells in the multi-cell rubber tube. Because the breakers are not flexible, they cannot be flexibly deformed to fit the deformation of the vehicle tire when the vehicle tires runs on the road. In order to fit the deformation of the vehicle tire, the breakers must be made of expensive material, thereby causing the manufacturing cost of the inner tube unable to be reduced to a reasonable level.

3. The base for the inner tube is made of rubber air balls fastened together, and comprised of two opposite outer walls arranged in parallel, two opposite inner walls respectively connected to the outer walls at an inner side, an annular master air chamber connected between the outer walls around the inner walls, a circular center through hole defined within the annular master air chamber, and a plurality of rubber coated breakers fastened to the inside of the outer walls and retained between the outer walls and the inner walls. This design has same drawbacks as stated above.

SUMMARY OF THE INVENTION

According to one aspect of the present invention, the inner tube comprises a base having air chambers in two opposite side walls thereof and zigzag insertion slots around the periphery of each of the side walls, a multi-cell rubber tube mounted on the base between its side walls and defining a plurality of zigzag insertion slots arranged one over another around a center opening thereof and an annular insertion slot surrounding the zigzag insertion slots for mounting patching glue, and a plurality of breaker assembles respectively mounted in the zigzag insertion slots in the base and the multi-cell rubber tube. According to another aspect of the present invention, each breaker assembly is comprised of a flexible, zigzag base pad formed of a plurality of air balls, and two sets of breakers alternatively arranged at top and bottom side walls of the zigzag base pad in a stagger. Because the base pad of each breaker assembly is flexible, the breaker assemblies can be flexibly deformed to fit the deformation of the vehicle tire when running on the road.

DETAILED DESCRIPTION OF THE PREFERRED EMBODIMENT

Figure 1:
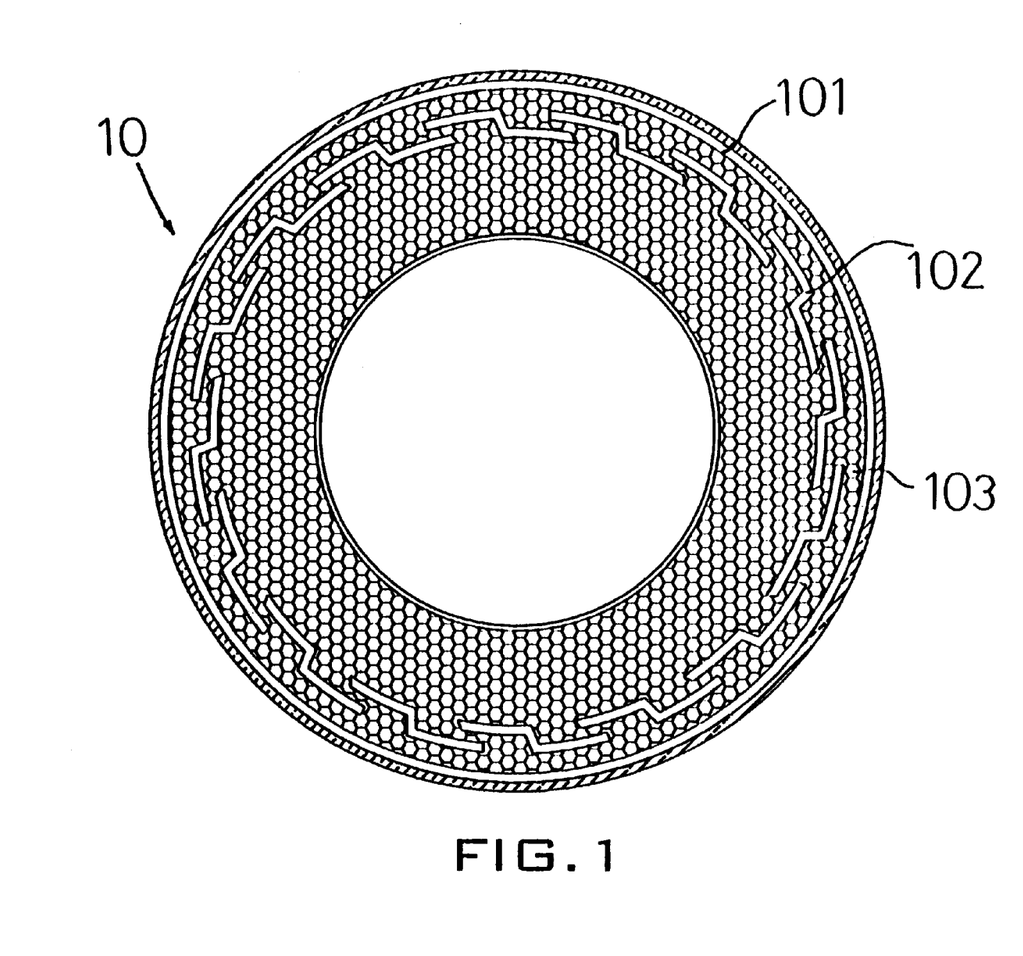
FIG. 1 is a sectional view of a multi-cell rubber tube for an inner tube for a vehicle tire according to the present invention.

Referring to FIG. 1, the multi-cell rubber tube, referenced by 10, is an annular member formed of a big number of rubber air balls 103, defining a plurality of zigzag insertion slots 102 arranged one over another around the center opening thereof and an annular insertion slot 101 surrounding the zigzag insertion slots 102 for mounting patching glue.

Figure 2:
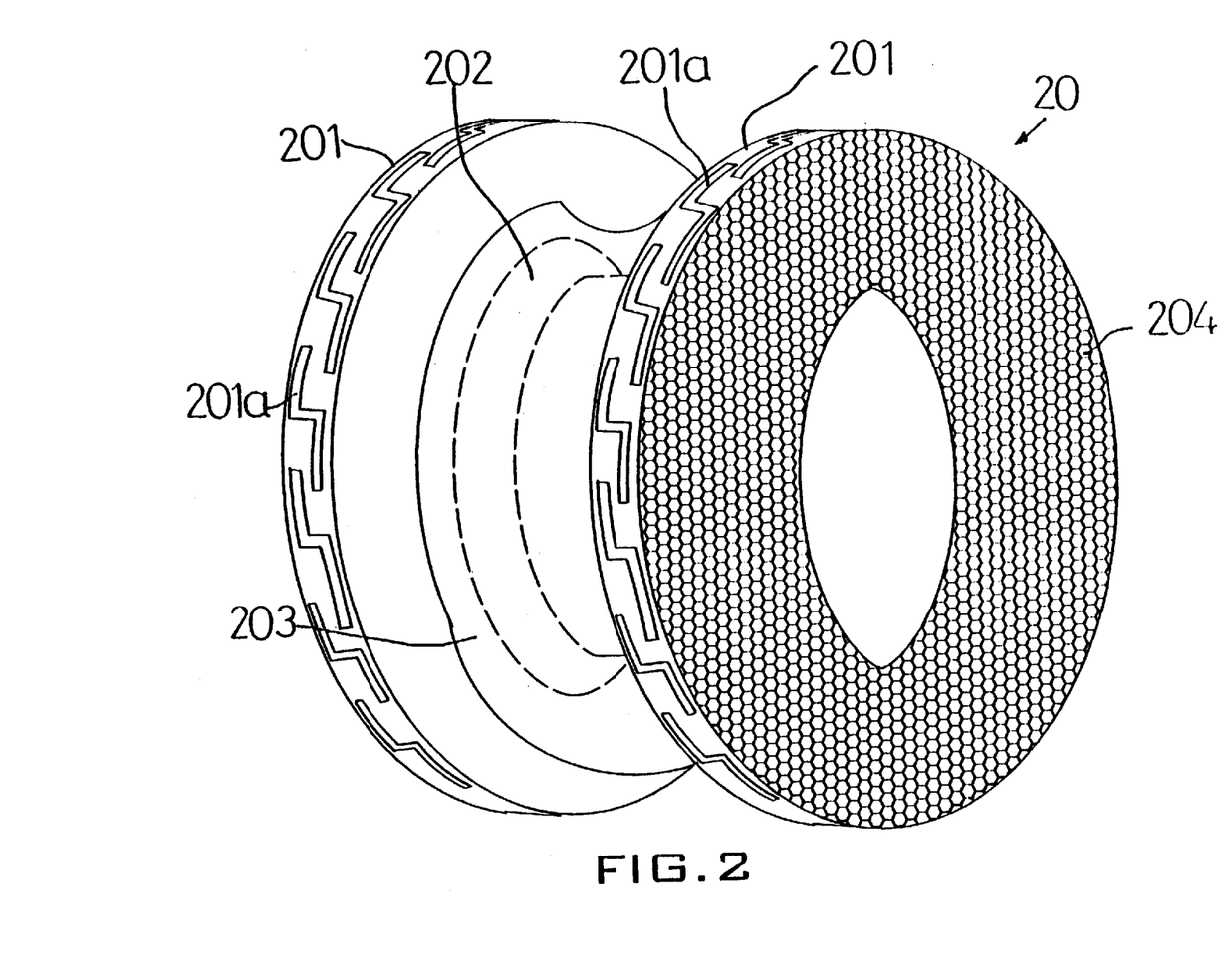
FIG. 2 is a perspective view of a base for an inner tube for a vehicle tire according to the present invention.

Referring to FIG. 2, the base, referenced by 20, is formed of a big number of rubber air balls 204, having a tubular shaft 202 and two parallel side walls 201 at two opposite ends of the shaft 202. The side walls 201 each comprise a plurality of zigzag insertion slots 201a longitudinally arranged one above another around the periphery, and a master air chamber 203. The base 20 forms with the aforesaid multi-cell rubber tube 10 an inner tube for a vehicle wheel.

Figure 3:
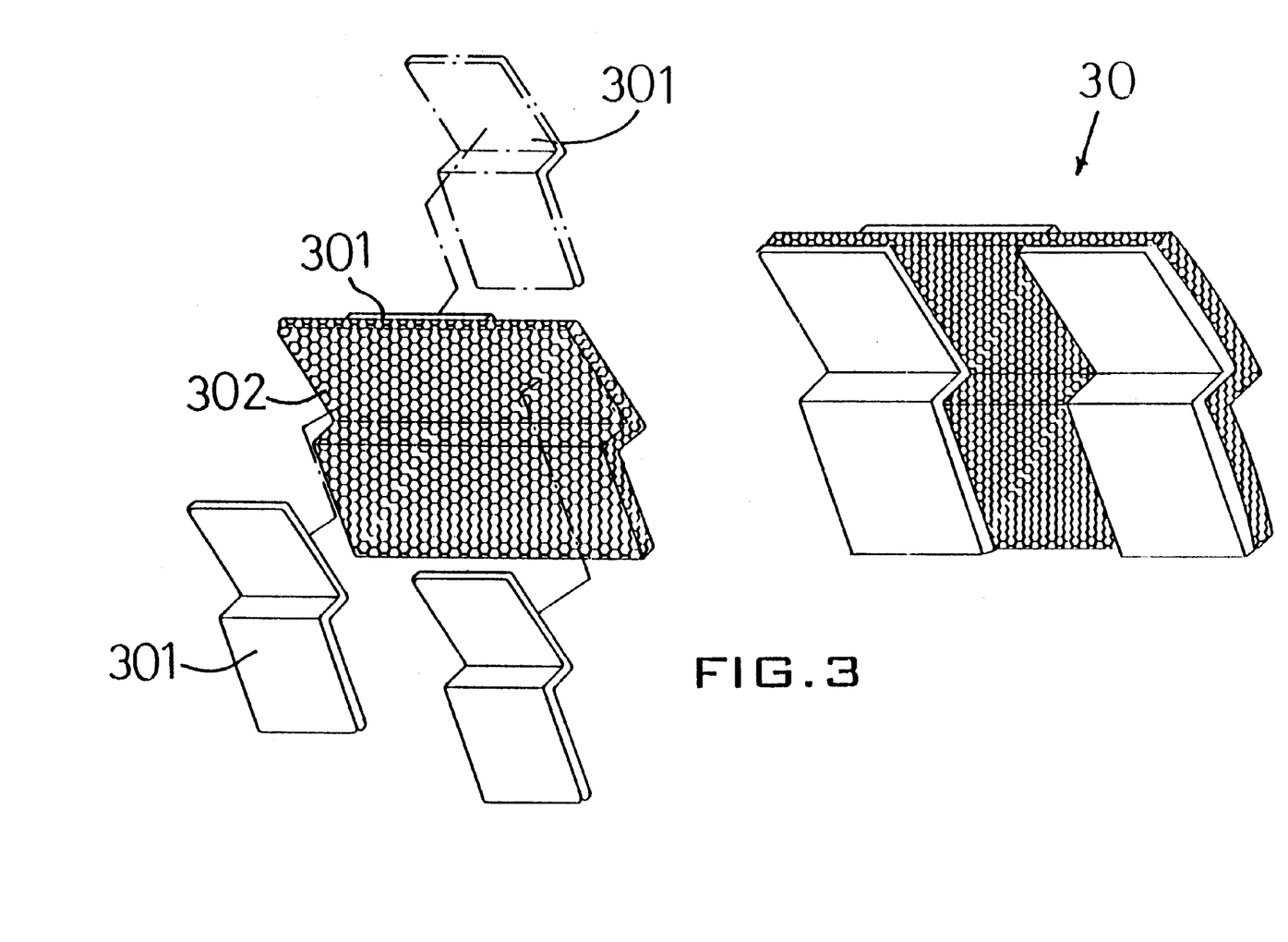
FIG. 3 is perspective and exploded views of a breaker assembly for an inner tube for a vehicle tire according to the present invention.
Figure 4:
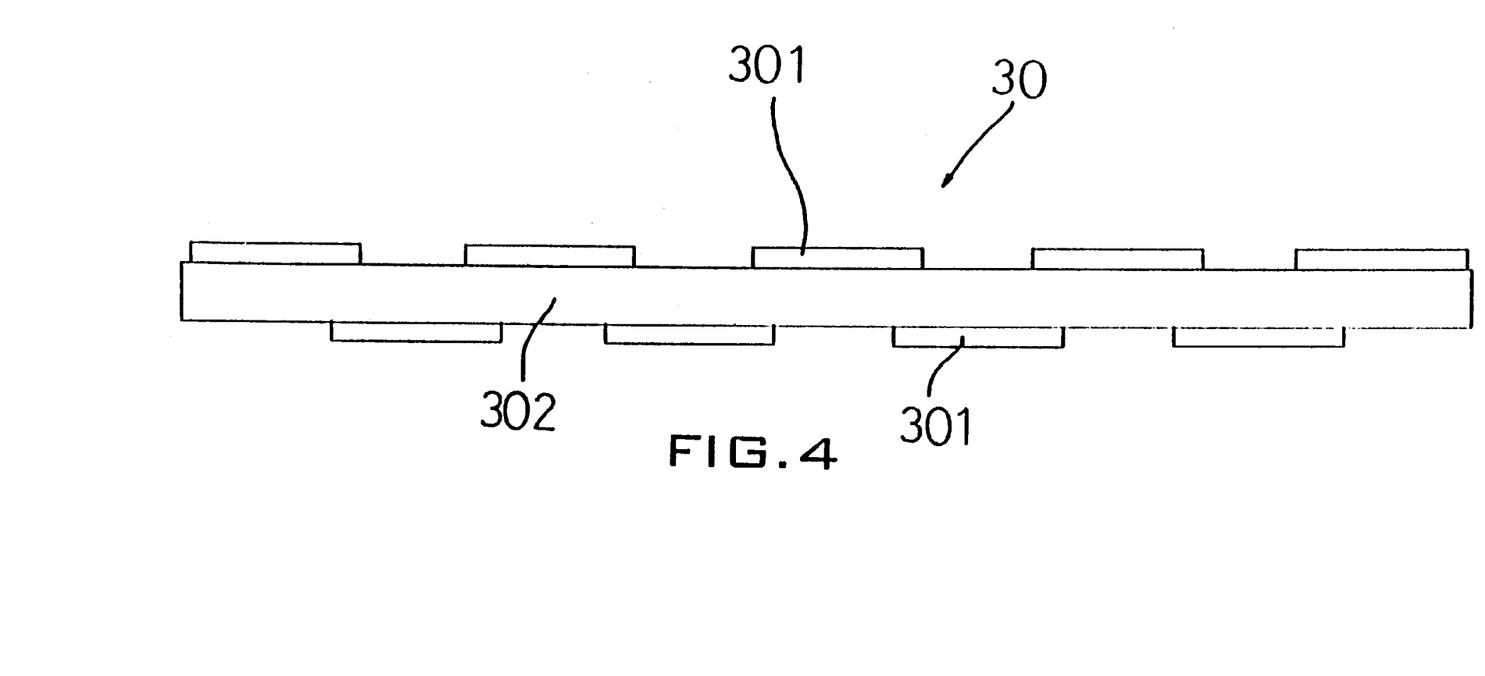
FIG. 4 is a sectional view of a breaker assembly according to the present invention.
Figure 5:
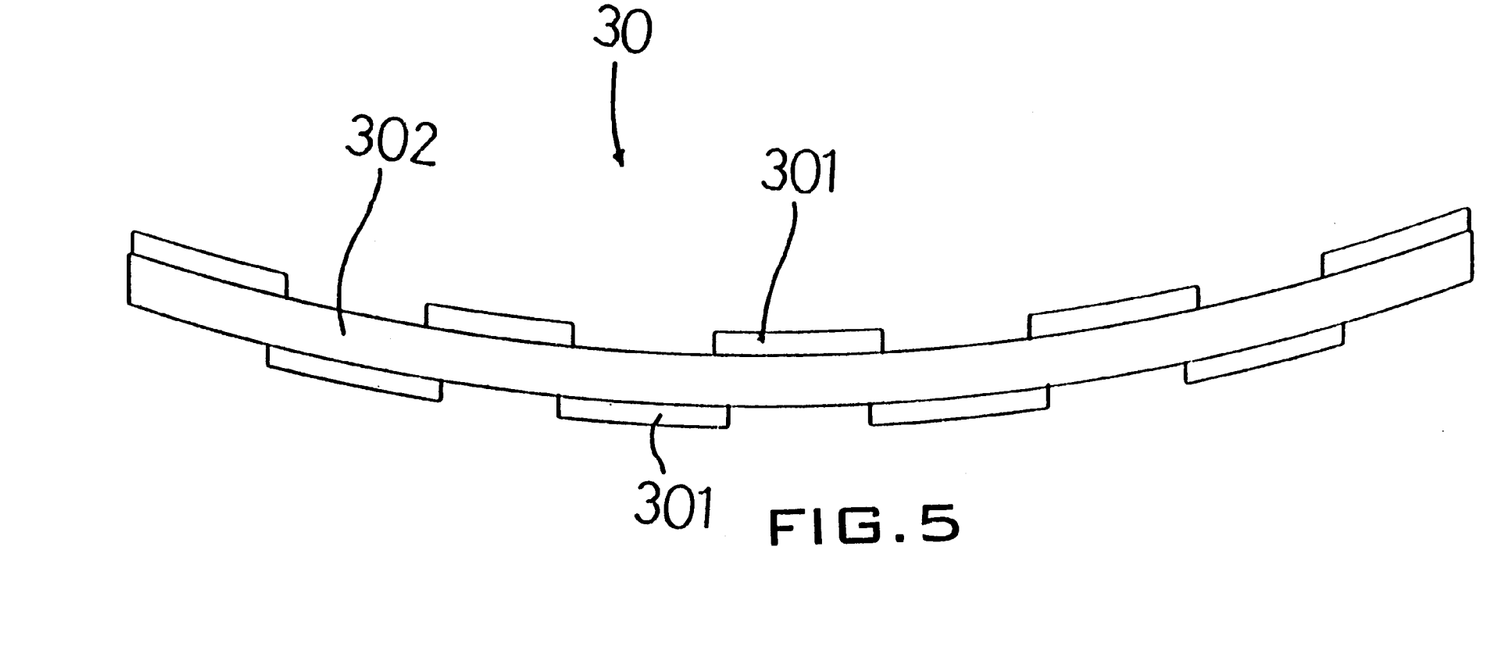
FIG. 5 is similar to FIG. 4 but showing the breaker assembly curved.

Referring to Figures from 3 through 5, a breaker assembly 30 is shown comprised of a zigzag base pad 302 formed of a big number of air balls, and two sets of breakers 301 alternatively arranged at the top and bottom side walls of the zigzag base pad 302 in a stagger. Because the zigzag base pad 302 is flexible, the breaker assembly 30 can be deformed to fit the shape change of the inner tube of the running vehicle tire. Because the breakers 301 are alternatively arranged at the top and bottom side walls of the zigzag base pad 302 in a stagger, the inner tube of the vehicle tire is well protected.

Figure 6:
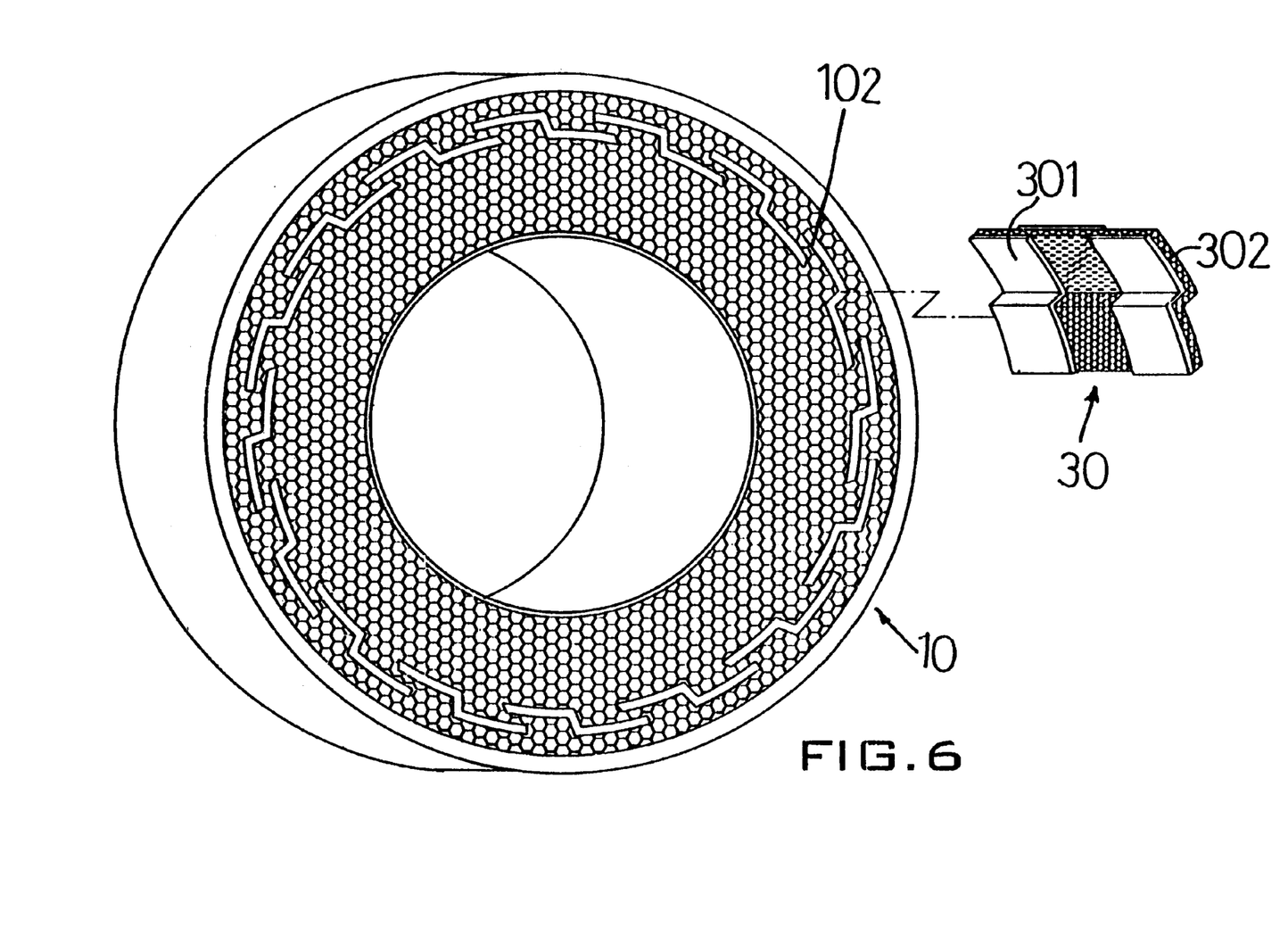
FIG. 6 shows the installation of a breaker assembly in one zigzag insertion slot at the multi-cell rubber tube according to the present invention.
Figure 7:
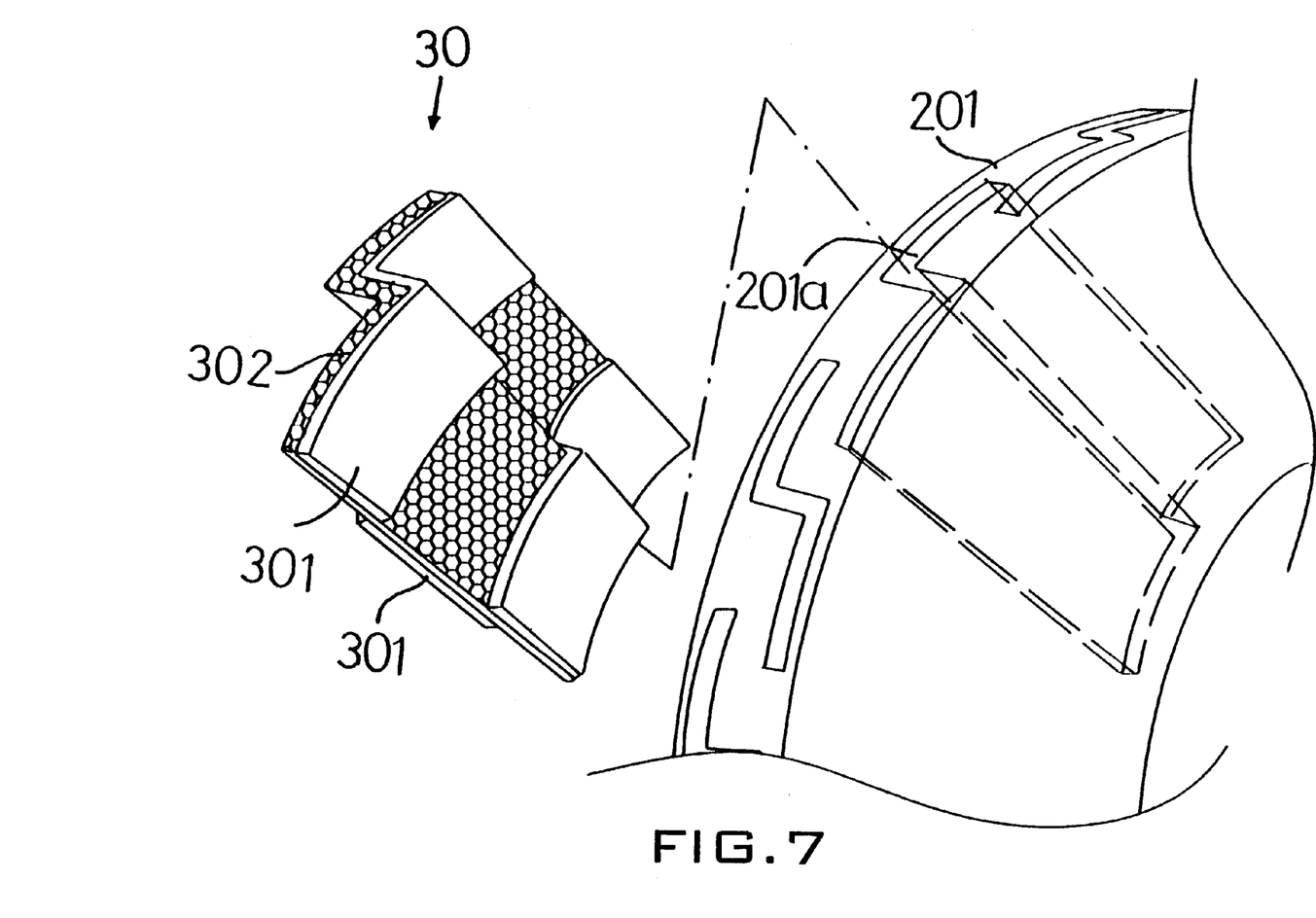
FIG. 7 shows the installation of a breaker assembly in one zigzag insertion slot at one side wall of the base according to the present invention.
Figure 8:
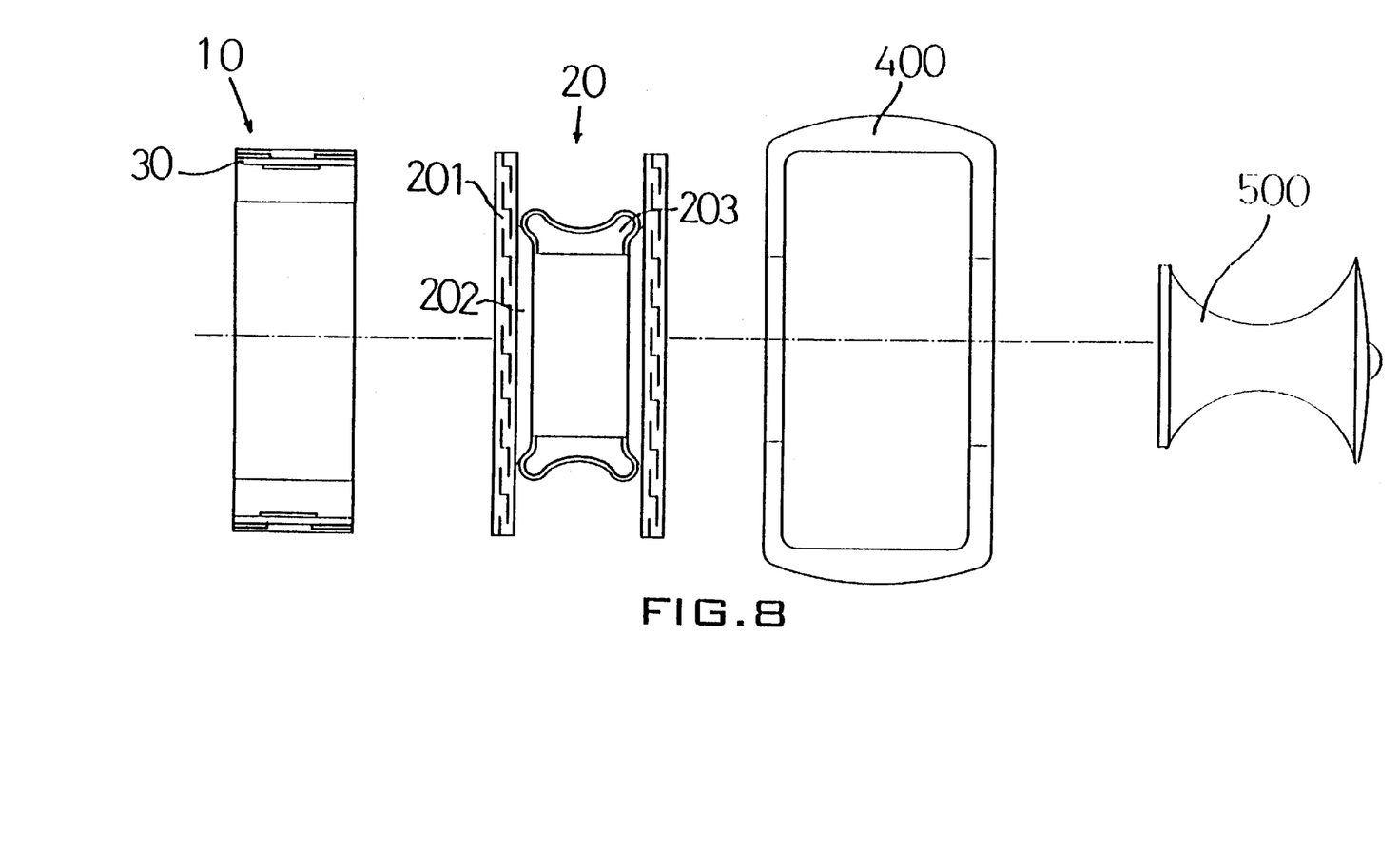
FIG. 8 is a sectional view showing the relationship between the multi-cell rubber tube, the base, the outer tube, and the wheel.

Referring to Figures from 6 through 8, breaker assemblies 30 are respectively mounted in the zigzag insertion slots 102 at the multi-cell rubber tube 10 and the zigzag insertion slots 201a at the base 20, then the multi-cell rubber tube 10 is mounted on the base 20, forming an inner tube. The inner tube thus obtained is then fastened to a wheel (rim) 500, and covered within an outer tire 400. After installation, the master air chamber 203 in each side wall 201 is respectively inflated.

Figure 9:
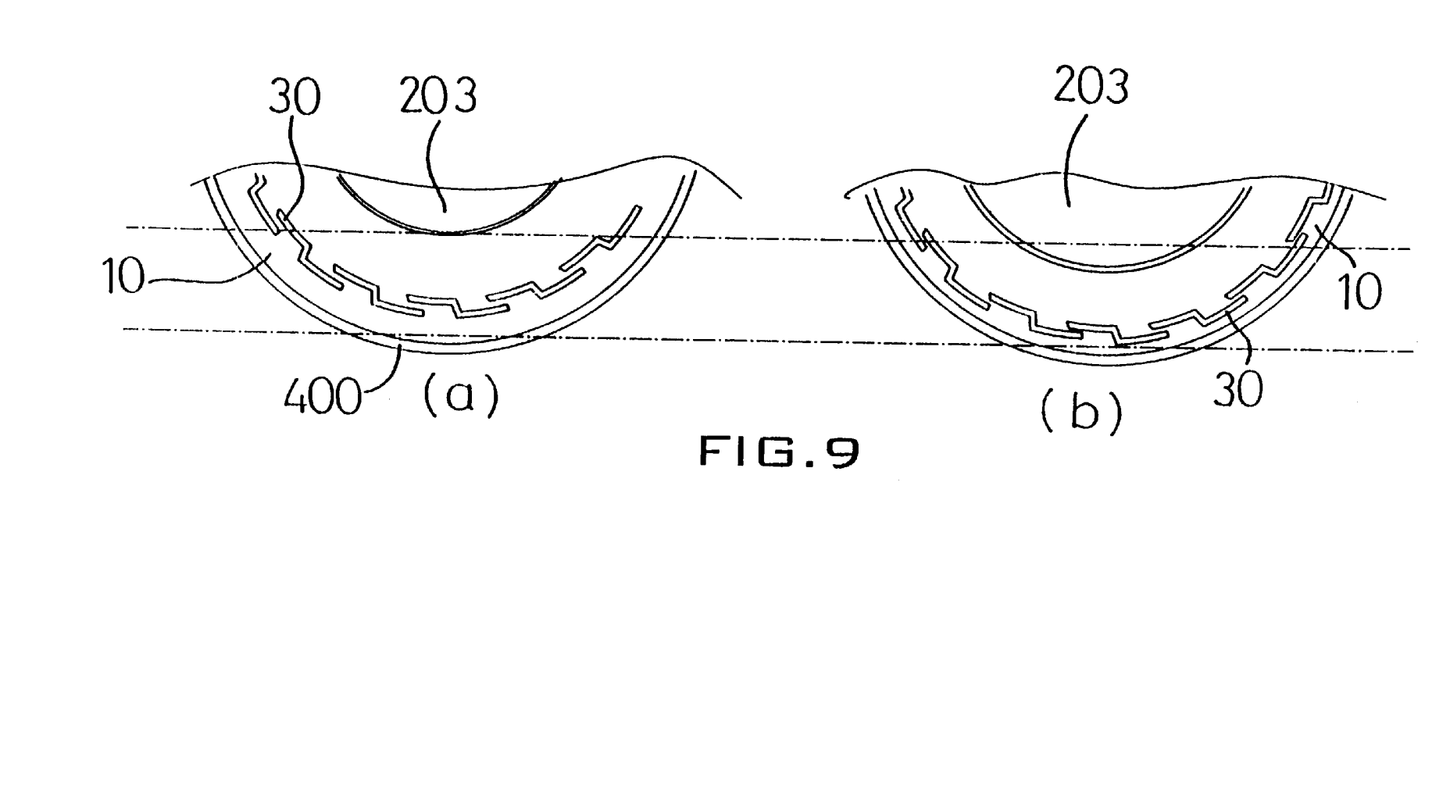
FIG. 9 is a schematic drawing showing the status of the inner tube before inflation and after inflation according to the present invention.

FIG. 9(a) shows a status of the multi-cell rubber tube 10 before inflation of the base 20 (see also FIGS. 2 and 8). FIG. 9(b) shows a status of the multi-cell rubber tube 10 after inflation of the base 20. After inflation of the base 20, the multi-cell rubber tube 10 is compressed, the wall thickness of the multi-cell rubber tube 10 becomes thinner, and the breakers 301 of the breaker assemblies 30 are forced against one another to protect the inner tube of the tire.

It is to be understood that the drawings are designed for purposes of illustration only, and are not intended for use as a definition of the limits and scope of the invention disclosed.

What the invention claimed is:

1. An inner tube for a vehicle tire comprising:

a base formed of a plurality of rubber air balls, said base comprising a tubular shaft and two parallel side walls at two opposite ends of said shaft, said side walls each comprising a plurality of zigzag insertion slots longitudinally arranged one above another around the periphery thereof, and a master air chamber;

a multi-cell rubber tube formed of a plurality of rubber air balls and mounted on said base between the parallel side walls of said base, said multi-cell rubber tube defining a plurality of zigzag insertion slots arranged one over another around a center opening thereof and an annular insertion slot surrounding the zigzag insertion slots for mounting patching glue; and a plurality of breaker assembles respectively mounted in the zigzag insertion slots in said base and said multi-cell rubber tube, said breaker assemblies each comprised of a zigzag base pad formed of a plurality of air balls, and two sets of breakers alternatively arranged at top and bottom side walls of said zigzag base pad in a stagger.

* * * * *